Sept. 11, 1928.
O. W. THOMPSON
1,683,743
COMBINED GAUGE AND THERMOMETER
Filed June 26, 1924
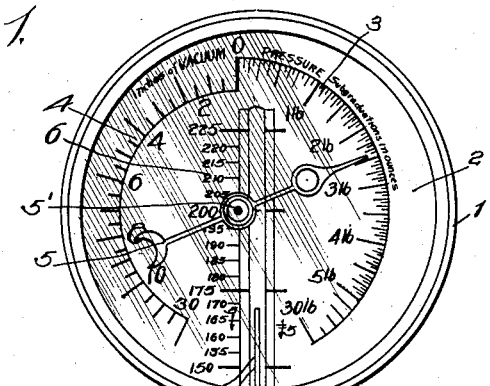
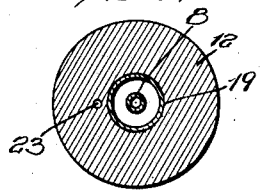
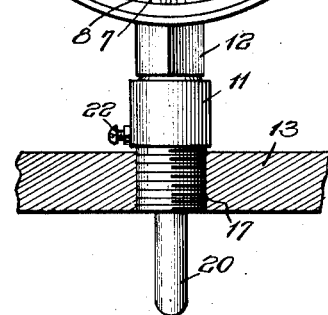
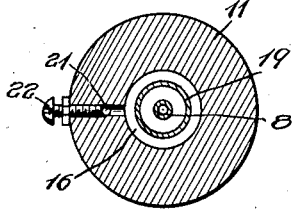
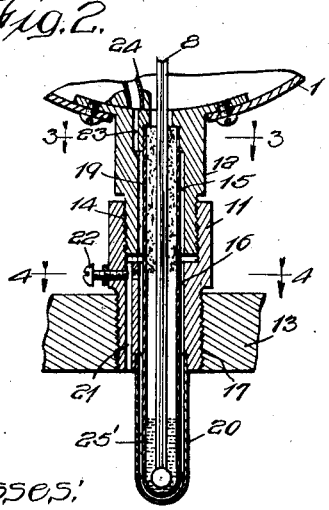
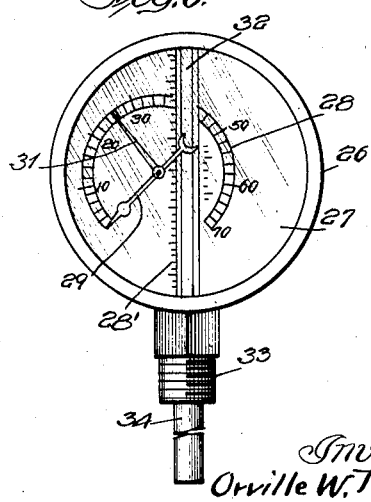
Witnesses:
W. F. Kilroy
Inventor:
Orville W. Thompson Patented Sept. 11, 1928.

1,683,743

UNITED STATES PATENT OFFICE.

ORVILLE W. THOMPSON, OF CHICAGO, ILLINOIS, ASSIGNOR TO JAS. P. MARSH & COMPANY, OF CHICAGO, ILLINOIS, A CORPORATION OF ILLINOIS.

COMBINED GAUGE AND THERMOMETER.

Application filed June 26, 1924. Serial No. 722,555.

My invention belongs to that general class of devices known as indicating mechanism, and relates more particularly to a combined gauge and temperature indicator. The invention has among its objects the production of a device of the kind described that is simple, compact, attractive, convenient, reliable, durable, and satisfactory for use wherever found applicable. More particularly the same relates to an improved instrument in which the gauge and temperature indicator scales are combined on the dial and an improved fitting for attaching the instrument whereby the instrument may be removed as an entirety from a boiler, tank or the like, without disassembling the instrument or without withdrawing any portion of the contents of the tank or system. Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 1 is a front elevation of my improved construction;

Fig. 2 is a sectional view through the fitting;

Fig. 3 is a sectional view taken substantially on line 3—3 of Fig. 2;

Fig. 4 is a sectional view taken substantially on line 4—4 of Fig. 2;

Fig. 5 is a sectional view taken substantially on line 5—5 of Fig. 1; and

Fig. 6 is a front elevation of a modified type of construction.

Referring to the drawings, in which the preferred embodiment of my invention is shown, 1 represents a casing of suitable size, shape and material, and 2 a dial therefore. As shown, the dial plate 2 is graduated as indicated at 3, the character of the same depending upon the type of instrument, that shown being adapted to a compound instrument which will indicate pressure and vacuum, the vacuum indications being shown at 4. The instrument is provided with an indicator or pointer 5 suitably connected with mechanism within the case which actuates the indicator.

It may be mentioned that the particular instrument shown is what is known as a compound retard gauge, the mechanism being adapted to indicate low pressures over wide range and thence higher pressures by a reduced travel of the indicator, vacuum being similarly indicated. As shown, the dial is also provided with suitable indications as shown at 6, for indicating temperature, for example in degrees Fahrenheit, 8 being a thermometer which is preferably seated in the recess or groove 7 formed in the dial plate 2.

As shown, the gauge is provided with a fitting 12 adapted to seat in and cooperate with the fitting 11, arranged on a boiler or tank 13, as the case may be, containing fluid under pressure. It will be particularly noted by referring to Fig. 1 that the mechanism is so arranged that the thermometer 8 is centrally disposed in the fitting part 12, the spindle 5' which carries the indicator 5 being offset to one side of the center of the dial. It will be noted that in the particular construction shown, the thermometer extends substantially diametrically across the dial, while the pivotal center of the indicator 5, as indicated at 5', is at one side of the center of the dial. The scales for the gauge are so designed that a symmetrical appearance is secured and the gauge face does not appear lopsided or overbalanced at one side. This also makes distinctive scales, distinguishing between pressure and vacuum. This particular style may be embodied in any type of gauge, but it is particularly desired in one of this type. The desirability of having the thermometer 8 arranged substantially diametrically will be obvious from the further description of the device.

The fitting part 12 is provided with a threaded portion 14 for engagement with the fitting 11. The two fittings 12 and 11 are provided with bores 15 and 16, respectively. The fitting 12 carries a thermometer casing 19 which is of a length to project through the fitting 11, as most clearly shown in Fig. 2, and fitting 11 is also provided with an outer casing 20 into which the casing 19 and thermometer projects, the casing 20 being secured to the fitting 11 in any suitable manner. As shown, fitting part 11 is provided with a port or duct 21 which may be closed as desired by a valve member 22 or its equivalent, and the fitting part 12 is provided with a duct 23 which communicates with the Bourdon spring or other pressure mechanism within the casing. Obviously, steam, water, gas or other fluid, may have access to the mechanism within the gauge through the ducts mentioned and the connecting space formed by the chamber 15. Likewise on a vacuum gauge, the vacuum in the tank is effectively indicated on the gauge. Steam, hot water, or the like, may enter into the chamber 16 about the tube 19 and within the shell 20.

In the construction of device shown in Fig. 6, a modified dial arrangement is illustrated, 26 representing the casing, 27 the dial provided with the scale 28 and thermometer scale 28'. 29 represents the indicator and 32 the thermometer, 31 being merely a set hand common in some types of altitude gauges. Fitting 33 and tube 34 may be similar to that illustrated in detail in Fig. 2.

The operation of the device will be obvious from the preceding. When the instrument is applied to a boiler, tank or the like, pressure or vacuum is indicated by the pointer 5, while the temperature is indicated on the thermometer scale. If, at any time it is desired to remove the instrument, valve 22 may be shut and thence the instrument removed similar to any gauge without requiring any disassembling of parts, lowering the pressure in the tank, or in the case of a hot water or like system, or where fluid under pressure is contained in the tank and system, without lowering the level of the fluid. The tube 35 or part 20 prevents any leakage through the fitting bore when the instrument is removed, while the tube 19 at all times protects the thermometer against breakage when the instrument is removed. In this connection the thermometer may be set in the tube 19 in plaster Paris or the equivalent so that it always retains its place and is in proper relation to the dial. If desired to fill the bottom of tube 19 with mercury, I generally make the tube of steel which will not be affected by the mercury. When the instrument is returned to the fitting, it may be applied in the usual manner and then the valve 22 opened, subjecting the gauge mechanism proper to control. Obviously, any suitable materials such as mercury or the like may be placed in the bottom of the tube 20 so as to facilitate the conducting of heat to the inner tube 19 where it will affect the thermometer. As before mentioned, it is not necessary to remove or adjust the thermometer or any of the gauge mechanism in order to remove the instrument as the same may be turned down into place or taken off, the central arrangement of the parts and the sealing up of the thermometer securing the results mentioned.

The central arrangement of the thermometer has another advantage in that it permits a longer tube and consequently more open readings, so that the temperature may be read at a distance.

The particular gauge shown in Fig. 1 is adapted to be used on a heating system in which the gauge will indicate either a vacuum or a pressure in the system, and at the same time the thermometer will indicate temperature. This is desired because frequently while there may appear no pressure, there may be steam in the pipes, consequently the engineer or fireman can tell from the thermometer what the condition is when there would be no indication from the gauge itself. This is further desirable as it tends to reduce fuel costs by reducing the amount of fuel burned unnecessarily, due to the fact that there may be heat present even through not sufficient for pressure. This is particularly true on a mild day. Obviously, with the type of instrument shown in Fig. 6, the instrument would not only indicate temperature but also the head of water in a hot water heating system.

Having thus described my invention, it is obvious that various immaterial modifications may be made in the same without departing from the spirit of my invention; hence I do not wish to be understood as limiting myself to the exact form, construction, arrangement and combination of parts herein shown and described or uses.

What I claim as new and desire to secure by Letters Patent is:

1. In a device of the class described, the combination of a temperature thermometer and gauge combined in a single instrument case having a threaded extended fitting enclosing the thermometer bulb, and an attachment for securing both to a boiler through a single threaded opening, the gauge being in communication through the attachment with the interior of the boiler, said attachment being constructed to permit the insertion of the encased bulb of the temperature thermometer in direct contact with the contents of the boiler simultaneously with the operative attachment of the threaded gauge fitting thereto without disassociation of the thermometer from the gauge construction, and means for preventing the escape of the contents of the boiler upon the removal of the gauge from the attachment.

2. In a gauge and in combination, a fitting on the gauge having a screw threaded shank with a thermometer casing projecting therefrom, said shank being provided with a fluid passage spaced from the center thereof, a boiler fitting provided with a screw threaded portion at one end to be screwed into a boiler and a threaded outer end to receive the gauge fitting, said boiler fitting being provided with a centrally arranged tubular bore with an extending casing part forming a chamber in the fitting for said thermometer casing at a point within the boiler, said boiler fitting having a fluid passage at one side communicating with the fluid passage in the gauge fitting and with the interior of the boiler, and means for controlling the passage of fluid therethrough.

3. In a device of the kind described and in combination, a gauge including a suitable casing having a hollow screw threaded extension and provided with a fluid passage and with an opening through said extension, a thermometer tube extending centrally through said screw threaded extension and a casing carried by the extension and enclosing the projecting part of said tube and sealing the same in the extension, and a boiler fitting provided with a screw threaded portion to be screwed into a boiler, and having an opening therethrough of a size to permit the insertion of said thermometer casing into the boiler, said boiler fitting having an extending portion enclosing said thermometer casing, and provided with a duct communicating with said hollow screw threaded extension at the exterior of said casing and with the interior of the boiler, and means for controlling the passage of fluid through said duct.

4. In an instrument of the kind described and in combination, an instrument casing, a dial arranged thereover, a Bourdon spring positioned in the casing, an indicator movable over the dial, and a thermometer tube arranged on the dial, a fitting carried by the casing and communicating with the Bourdon spring arranged within the gauge casing, said fitting provided with a threaded lower end, said thermometer tube projecting through the fitting substantially centrally the threaded end of the fitting to the exterior thereof, a casing carried by said fitting and encasing said tube, a cooperating tubular fitting arranged with an internal threaded outer end for engagement with the thread on said first-mentioned fitting, and with a threaded portion for attachment to a support, said tube and its casing projecting through and beyond the second fitting, and an extending casing part carried by the second fitting and encasing the thermometer and its casing at the outer end thereof, said cooperating tubular fitting provided with a duct extending therethrough and communicating with the mechanism within the instrument casing through the fitting thereon, and means for closing said duct as desired.

5. The combination with an instrument comprising a housing, a screw-threaded fitting extending from the housing, said fitting being provided with a passage therethrough, a thermometer projecting from the housing through said fitting, and mechanism disposed in said housing and constituting an altitude gauge communicating with said passage, of a second fitting adapted to be secured to a boiler and provided with screw-threads whereby the first-mentioned screw-threaded fitting may be detachably secured thereto, said second fitting having a passage therethrough communicating with the interior of the boiler and with the first-mentioned passage and being formed to permit the thermometer to project therethrough, and means carried by said second fitting to control the flow of fluid through said passage therein.

6. In a device of the class described, the combination of a thermometer and gauge combined in a single instrument casing, having an extended fitting enclosing the thermometer bulb, and an attachment for securing both to a boiler through a single opening, the gauge being in communication through the attachment with the interior of the boiler, said attachment being constructed to permit the insertion of the encased bulb of the thermometer in contact with the contents of the boiler simultaneously with the operative attachment of the gauge fitting thereto without disassociation of the thermometer from the gauge construction, and means for preventing the escape of the contents of the boiler upon removal of the gauge from the attachment.

In testimony whereof, I have hereunto signed my name.

ORVILLE W. THOMPSON.